US009055395B2

(12) United States Patent  
Hart et al.

(10) Patent No.: US 9,055,395 B2  
(45) Date of Patent: Jun. 9, 2015

(54) LOCATION TRACKING USING RESPONSE MESSAGES IDENTIFYING A TRACKED DEVICE IN A WIRELESS NETWORK

(75) Inventors: Brian Donald Hart, Sunnyvale, CA (US); Allan Thomson, Pleasanton, CA (US); Visshwanth Reddy, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1036 days.

(21) Appl. No.: 12/590,657

(22) Filed: Nov. 12, 2009

(65) Prior Publication Data

US 2011/0110293 A1 May 12, 2011

(51) Int. Cl.
  *H04W 4/00* (2009.01)
  *H04W 4/02* (2009.01)
  *G01S 5/00* (2006.01)
  *H04W 4/20* (2009.01)
  *H04W 74/08* (2009.01)

(52) U.S. Cl.
  CPC . *H04W 4/02* (2013.01); *H04W 4/00* (2013.01); *G01S 5/0009* (2013.01); *H04W 4/20* (2013.01); *H04W 74/0816* (2013.01)

(58) Field of Classification Search
  USPC .......................................................... 370/328
  See application file for complete search history.

(56) References Cited

U.S. PATENT DOCUMENTS

| 7,590,418 | B1 | 9/2009 | Thomson |
| 2002/0045435 | A1* | 4/2002 | Fantaske ........................ 455/403 |
| 2004/0157619 | A1* | 8/2004 | Corson et al. .............. 455/456.1 |
| 2004/0258012 | A1* | 12/2004 | Ishii .............................. 370/328 |
| 2004/0259571 | A1* | 12/2004 | Joshi .......................... 455/456.1 |
| 2007/0249366 | A1 | 10/2007 | Thomson et al. |
| 2007/0281707 | A1 | 12/2007 | Thomson et al. |
| 2008/0180244 | A1 | 7/2008 | Howarth et al. |
| 2008/0204248 | A1 | 8/2008 | Cam Winget et al. |

FOREIGN PATENT DOCUMENTS

| EP | 1 253 437 A2 | 10/2002 |
| EP | 1 301 057 A1 | 4/2003 |
| WO | WO 01/10154 A1 | 2/2001 |
| WO | WO 02/25824 A2 | 3/2002 |

* cited by examiner

*Primary Examiner* — Sulaiman Nooristany  
(74) *Attorney, Agent, or Firm* — Cindy Kaplan

(57) ABSTRACT

In one embodiment, an apparatus includes a receiver configured for receiving a response message from a tracked device in a wireless network, the response message transmitted in response to a provoking message having an identifier of the tracked device in a transmitter address field, and a processor for measuring at least one location related parameter, extracting the identifier of the tracked device from the response message and identifying the response message as a location tracking message based on information in the response message. A field of the response message includes the identifier of the tracked device copied from the provoking message and the transmitter address is not provided in another field of the response message.

20 Claims, 4 Drawing Sheets

LOCATION TRACKING USING RESPONSE MESSAGES IDENTIFYING A TRACKED DEVICE IN A WIRELESS NETWORK

BACKGROUND

The present disclosure relates generally to wireless networks, and more particularly, to location tracking in wireless networks.

Location tracking is used to determine the location of a device in a wireless network. Location tracking techniques include, for example, distance based techniques such as Time of Arrival (ToA), Time Difference of Arrival (TDoA), and Received Signal Strength Indication (RSSI), and angle based techniques such as Angle of Arrival (AoA). ToA systems are based on measurement of the arrival time of a signal transmitted from a tracked device to several receiving sensors. TDoA techniques use relative time measurements at multiple receiving sensors to identify the location of the tracked device. In RSSI systems, knowledge of the transmitter output power, cable losses, and antenna gains, and received signal strength of a received packet along with an appropriate path loss model allow for calculation of the distance between the tracked device and a tracking device in the wireless network.

Tracking devices collect location information about the tracked device based on transmissions sent from the tracked device. The collected information may be transmitted to a central location, such as a location server.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
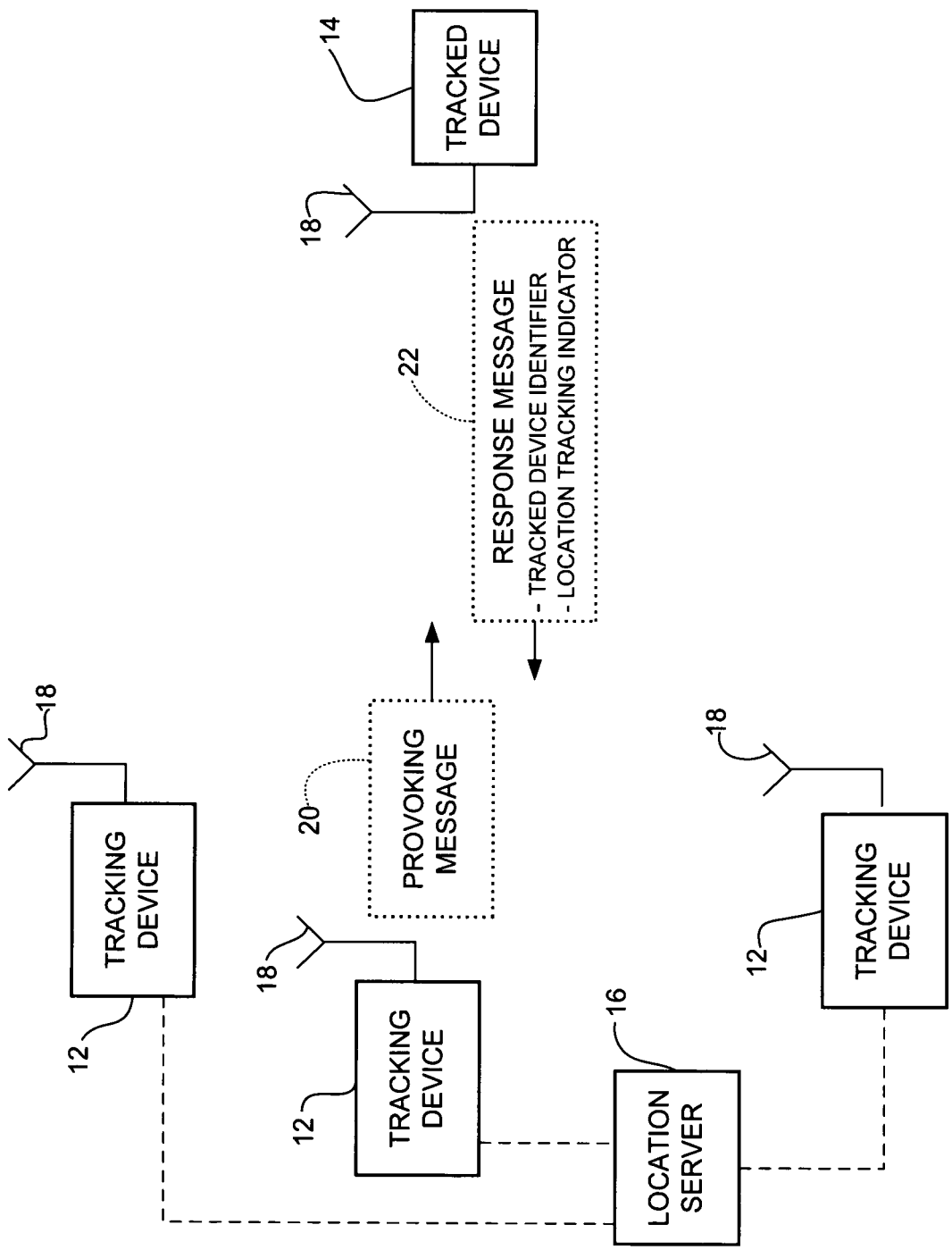
FIG. 1 illustrates an example of a network in which embodiments described herein may be implemented.

In one embodiment, a method generally comprises receiving from a tracked device in a wireless network, a response message transmitted in response to a provoking message comprising an identifier of the tracked device in a transmitter address field, and processing the response message at a tracking device. Processing comprises measuring at least one location related parameter, extracting the identifier of the tracked device from the response message and identifying the response message as a location tracking message based on information in the response message. A field of the response message includes the identifier of the tracked device copied from the provoking message. The transmitter address is not provided in another field of the response message.

In another embodiment, an apparatus generally comprises a receiver configured for receiving a response message from a tracked device in a wireless network, the response message transmitted in response to a provoking message having an identifier of the tracked device in a transmitter address field, and a processor for measuring at least one location related parameter, extracting the identifier of the tracked device from the response message and identifying the response message as a location tracking message based on information in the response message. A field of the response message includes the identifier of the tracked device copied from the provoking message. The transmitter address is not provided in another field of the response message.

Example Embodiments

The following description is presented to enable one of ordinary skill in the art to make and use the embodiments. Descriptions of specific embodiments and applications are provided only as examples and various modifications will be readily apparent to those skilled in the art. The general principles described herein may be applied to other embodiments and applications without departing from the scope of the invention. Thus, the invention is not to be limited to the embodiments shown, but is to be accorded the widest scope consistent with the principles and features described herein. For purpose of clarity, details relating to technical material that is known in the technical fields related to the embodiments have not been described in detail.

Embodiments described herein provide for location tracking of a device within a wireless network. Various measurement techniques may be used, including, for example, Time of Arrival (ToA), Time Difference of Arrival (TDoA), Received Signal Strength Indication (RSSI), Angle of Arrival (AoA), or other techniques used to track the location of a device. In ToA and TDoA systems, location information collected is the time of arrival, which is most reliable if all tracking devices receive the same packet, record its timestamp and forward it to a location server. Since the ToA algorithms are computationally intensive, it is preferred that the system process only packets specifically intended for location tracking. For RSSI based systems, different packets may be transmitted with different transmission powers. For example, the first few transmissions after a channel change, transmissions at different PHY (physical) rates, and retries are all sent at variable transmission powers. Thus, it is preferred that the tracking devices record the RSSI of the same packet.

The embodiments described herein collect location tracking information from a location tracking packet that is transmitted in response to a specified transmission, identifies the tracked device, and identifies the packet as a location tracking packet. The location tracking information is therefore obtained from the same transmission and location processing is performed for the most part, only on the location tracking packets.

Referring now to the drawings, and first to FIG. 1, an example of a network suitable for implementing embodiments described herein is shown. A plurality of tracking devices 12 are in communication with a tracked device 14. The tracking devices 12 and tracked device 14 are equipped with antennas 18 for wireless communication. In one embodiment, the tracking devices 12 and the tracked device 14 communicate in a Wireless Local Area Network (WLAN) and implement the wireless network protocol specified in the IEEE 802.11 standard. The tracking devices 12 may be, for example, access points (APs), base stations, site controllers, location sensors, or any other device comprising a receiving sensor operable for location tracking in a wireless environment. In the example of FIG. 1, three tracking devices 12 are shown, however, any number of tracking devices (e.g., 1, 2, or more than 3) may be used.

The tracked device 14 may be a client device, wireless mobile station, cellular phone, wireless VoIP phone, Personal Digital Assistant (PDA), laptop computer, Radio Frequency Identification (RFID) tag, rogue wireless access point, rogue wireless client, or any other type of device capable of operating in a wireless environment.

Both the tracking devices 12 and the tracked device 14 are configured to transmit and receive data. For example, the tracking devices may transmit data, control, or management traffic and receive acknowledgements, while the tracked device 14 receives the traffic and transmits acknowledgements. The tracking devices 12 provide location tracking information (e.g., ToA, TDoA, AoA, RSSI) associated with wireless frames transmitted by the tracked device 14 to a location server 16.

The location server 16 is configured to collect location tracking information from the tracking devices 12. The location server 16 may communicate, for example, via a local area network (LAN) or wide area network (WAN) that includes intermediate network devices (e.g., routers, switches, etc.), which allow for the transmission of data between the tracking devices 12 and the location server 16. The location server 16 may also be equipped with an antenna for communication with the access points 12 through the wireless network. The location server 16 may be implemented as a single location server or may be implemented as multiple servers (e.g., a leader location server and one or more follower location servers). The location server 16 may also be in communication with a central controller (not shown) configured for receiving location services requests and forwarding the requests to the location server or location data to the location server. The location server 16 may also be located at one of the tracking devices 12.

In one embodiment, one of the tracking devices 12 (referred to as a provoking device) transmits a provoking message 20 to the tracked device 14. The tracked device 14 responds with a response message 22. As described in detail below, the provoking message 20 is configured such that the generated response message 22 includes an identifier of the tracked device 14 and an indicator that the message 22 is a location tracking packet or is more likely to be a location tracking packet. A transmitting device other than one of the tracking devices 12 may also be used as the provoking device. For example, the provoking message 20 may be transmitted from another device in the wireless network or may be generated from a "choke point" or "portal" in communication with a RFID tag. The tracking devices 12 do not need to be within range of the provoking device since the response message 22 contains all of the information needed by the tracking device 12.

It is to be understood that the network shown in FIG. 1 is only one example and that networks having different components or arrangements, or operating in accordance with other communication protocols may be used without departing from the scope of the embodiments.

Figure 2:
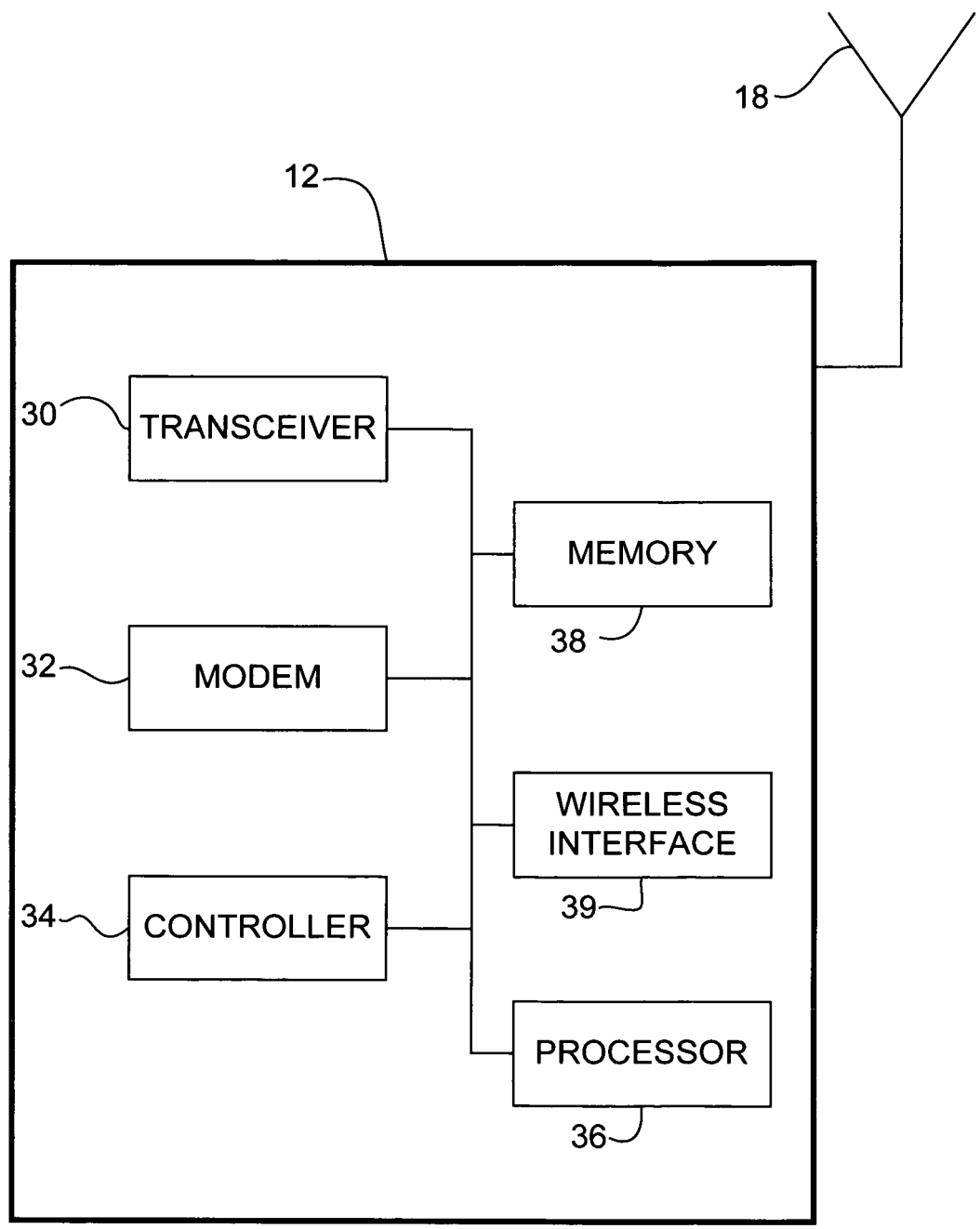
FIG. 2 depicts an example of a device useful in implementing embodiments described herein.

FIG. 2 is a block diagram illustrating an example of a wireless device (e.g., tracking device 12, tracked device 14) that may be used to implement embodiments described herein. The device includes a transceiver 30, modem 32, controller 34, processor 36, memory 38, and wireless interface 39 (e.g., IEEE 802.11 WLAN interface). The transceiver 30 comprises a combined transmitter and receiver; however, the device may also be configured with a separate transmitter and receiver. The modem 32 is configured to implement modulation and framing of signals according to the applicable communication protocol or standard (e.g., IEEE 802.11) under control of the controller 34. The controller 34 includes logic to implement embodiments described herein from the perspective of the AP 12 or client device 14. The logic may be encoded in one or more tangible media (memory 38) for execution by the processor 36. The logic may be in the form of software executed by the processor, digital signal processor instructions, or in the form of fixed logic in an integrated circuit, for example. The tracking device 12 may also include a network interface (not shown) for communication with a LAN, for example. It is to be understood that the device shown in FIG. 2 and described above is only one example and that different configurations of devices may be used, without departing from the scope of the embodiments.

Figure 3:
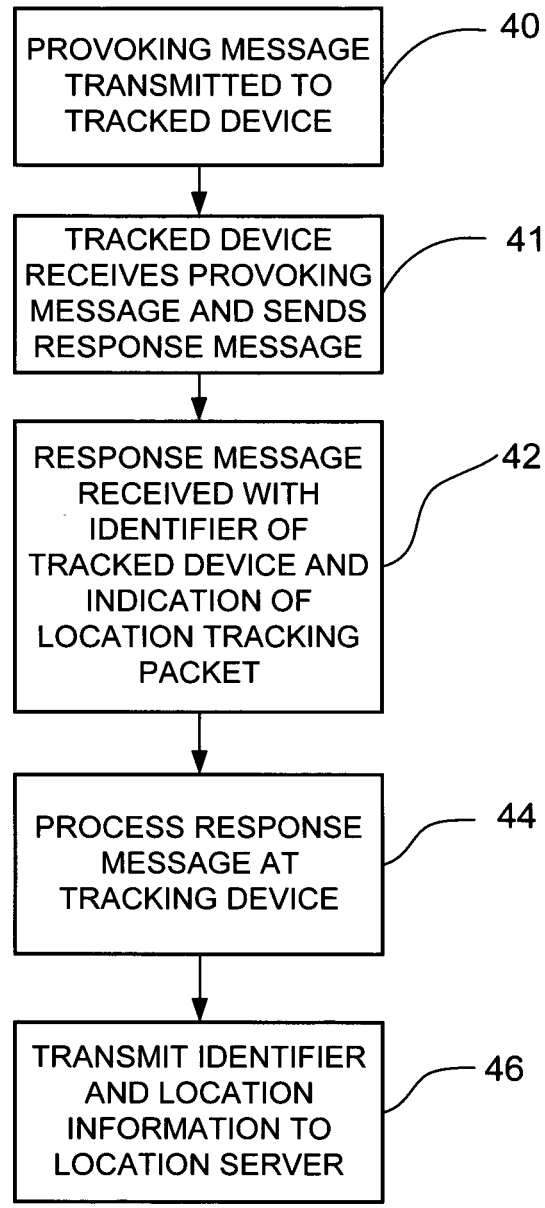
FIG. 3 is a flowchart illustrating an overview of a location tracking process, in accordance with one embodiment.

FIG. 3 is a flowchart illustrating an overview of a process for location tracking, in accordance with one embodiment. At step 40, provoking message 20 is transmitted to tracked device 14 (FIGS. 1 and 3). The provoking message 20 may be transmitted at periodic intervals, aperiodic intervals, random intervals, in response to an event, or via any other scheme. The provoking message 20 may be transmitted from one of the tracking devices 12 or from another device operating as a provoking device. The provoking message 20 includes an identifier of the tracked device 14 in a transmitter address field. The tracked device 14 receives the provoking message 20 and sends response message 22 (step 41). Response message 22 is received at the tracking devices 12 (step 42). The response message 22 includes the tracked device identifier copied from the provoking message 20 so that the tracked device 14 transmitting the response message can be identified by the tracking devices 12. The response message 22 also includes an indication that the packet is, or is more likely to be, a location tracking packet so that the tracking device 12 can identify the response message as a location tracking message. This prevents unnecessary processing of packets that are not used in location tracking. The tracking device 12 processes the response message 22 at step 44. The tracking device 12 measures one or more location related parameters, extracts the tracked device identifier from the response message 22, and identifies the message as a location tracking packet. The tracking device 12 then forwards the tracked device identifier and the location tracking information (e.g., time of arrival, received signal strength indicator, angle of arrival) from the transmission to the location server 16 (step 46).

It is to be understood that the process shown in FIG. 3 and described above is only one example and that steps may be added or deleted without departing from the scope of the embodiments. For example, step 41 occurs at the tracked device and is not part of the process performed at the tracking device. Also, step 40 may occur at a device other than the tracking device 12. The location server 16 may be located at the tracking device 12, in which case transmission of location information at step 46 comprises exchanging information between components at the tracking device 12.

The provoking and response messages 20, 22 may be any transmission used in wireless communications. In one embodiment, the provoking message 20 is a Request to Send (RTS) frame and the response message is a Clear to Send (CTS) frame. In another embodiment, the provoking message 20 is a null frame (e.g., QoS (Quality of Service) null frame), data frame, or management frame, and the response message 22 is an Acknowledgement (ACK) frame. Conventional CTS and acknowledgement frames include a Receiver Address (RA) field containing an address corresponding to the Transmitter Address (TA) from the previous RTS or QoS Null/data frame. Since these frames are optimized for size, they do not include a transmitter (source) address and therefore do not provide identification of the tracked device transmitting the CTS/ACK packet.

In one embodiment, the provoking message 20 is configured so that the response message 22 includes the tracked device address, rather than the provoking device address by setting the TA field in the provoking message to the tracked device address. This allows the tracked device 14 to automatically respond with a CTS/ACK frame that includes an address that identifies the tracked device. In one embodiment, the provoking message 20 is also configured so that a duration field atypical of IEEE 802.11 is transmitted by the tracked device 14 in its CTS/ACK response message. This provides a frame that can be distinguished from other transmissions typically sent in a wireless network. The tracking device 12 can therefore perform location tracking processing only (or for the most part only) on location tracking packets.

In some cases, packets that are not location tracking packets may be inadvertently forwarded to the location server 16. In one embodiment, the provoking device sends information about the provoking message 20 to the location server 16 so that the location server can filter out any packets not related to location tracking, which are received from the tracking devices 12.

Figure 4:
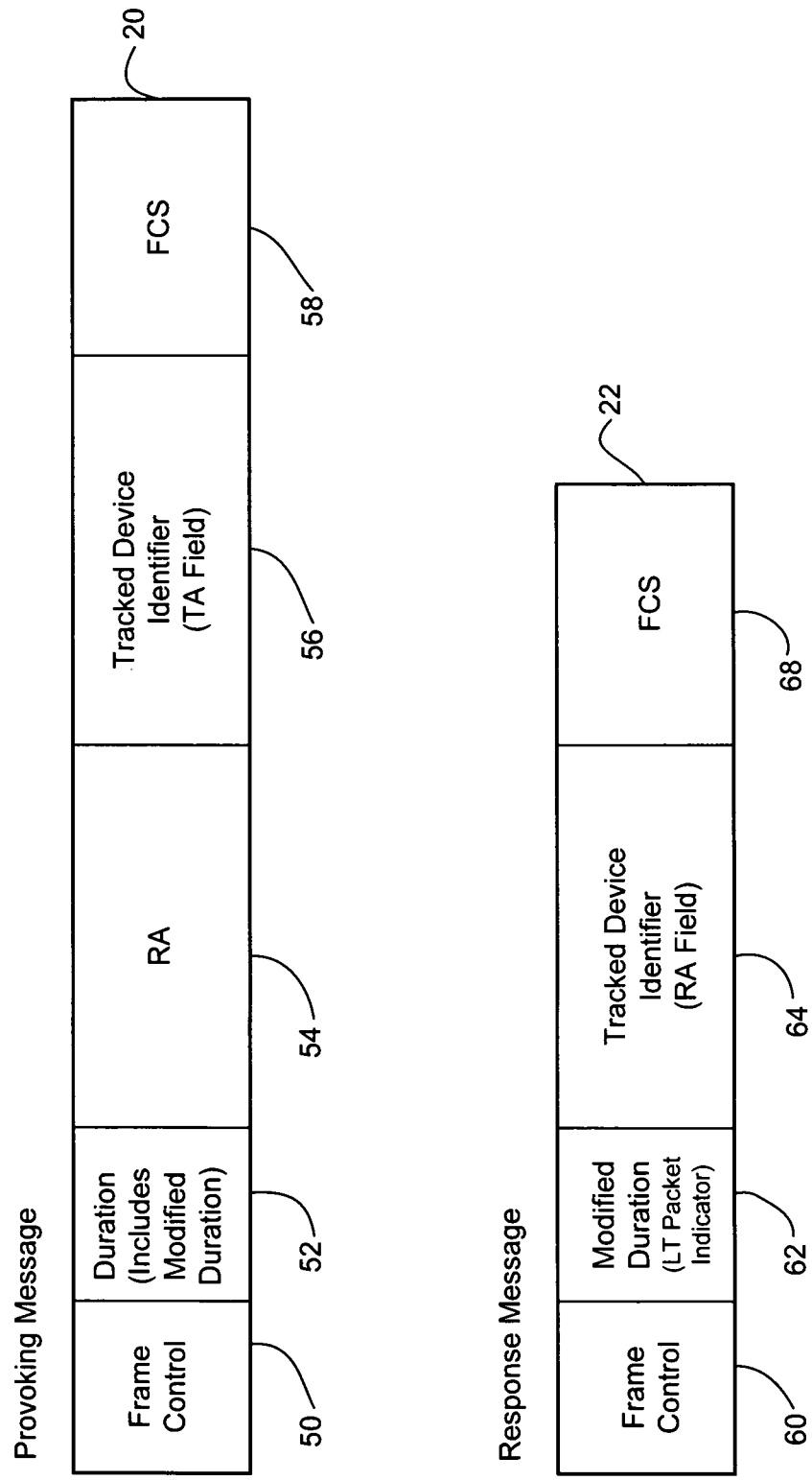
FIG. 4 illustrates an example of frame formats for use in the process of FIG. 3, in accordance with one embodiment.

FIG. 4 is an example of a format of the provoking message 20 and the response message 22, in accordance with one embodiment. The provoking message (e.g., RTS/QoS Null/Data frame) 20 includes Frame Control 50, Duration 52, Receiver Address (RA) 54, Tracked Device Identifier 56, and FCS (Frame Check Sequence) 58. The Tracked Device Identifier 56 is located in the transmitter address field. As described above, in conventional operation the TA field would contain the address of the provoking device. The provoking message 20 thus contains a 'spoofed TA field'. The duration 52 includes a modified duration (atypical of IEEE 802.11 duration) with the addition of other parameters (e.g., SIFS (Short Interframe Space), CTS/ACK transmission time). The response message (e.g., CTS/ACK packet) 22 includes Frame Control 60, Modified Duration (Location Tracking (LT) Packet Indicator) 62, Tracked Device Identifier 64, and FCS 68. The Tracked Device Identifier field 64 in the response message 22 contains the tracked device identifier copied from field 56 of the provoking message 20. It is to be understood that the term "copied" as used herein includes copying part or all of the tracked device identifier or copying and modifying the identifier before inserting the identifier into the response message. As previously described, in conventional operation the RA field in a CTS/ACK packet includes the address of the provoking device and no other field contains the transmitter address. Packets received at the tracking devices 12 with the duration set equal to the modified duration are processed for location tracking (e.g., ToA timestamping) and sent to the location server 16.

It is to be understood that the packet formats shown in FIG. 4 and described herein are only examples and that other packet formats may be used. For example, any packet including a MAC (Media Access Control) header may be used. Also, encrypted data packets in which the header is not encrypted may be used. Examples of values that may be used for the tracked device identifier and modified duration are provided below.

The tracked device identifier (spoofed TA) may be, for example, (a) the tracked device's MAC address, (b) the tracked device's MAC address converted from a globally administered address to a locally administered address (1 bit change), or (c) the tracked device's MAC address converted from a unicast address to a groupcast address (1 bit change). Another example for the tracked device identifier is (d) the ones complement of the tracked device's MAC address but with the unicast and global/local administration bits unchanged or (e) the tracked device's MAC address with the four least significant bits (LSBs), most significant bits (MSBs), or any other small subset of bits overwritten with 1's (or 0's). The scheme may also be dynamically varied to confuse any defensive measure, as described below. The examples (b) and (e) above may be combined with changes to the duration field, described below, since they do not uniquely identify the tracked device.

The duration 52 in the provoking message 20 includes the modified duration 62 so that the modified duration is transmitted by the tracked device 14 in the response message 22. The duration 52 in an RTS frame is:
    Modified Duration+SIFS+TXTIME (CTS);
and the duration in a QoS Null frame is:
    Modified Duration+SIFS+TXTIME (ACK).
Examples of the modified duration value are provided below.

In one example, the modified duration is taken from the following range:
    [1, 2, . . . TXTIME(minimum packet length)+SIFS−1];
    where TXTIME is transmission time and these are all atypical values of the duration field.

The value taken from the range can be interpreted via any one of the following examples:
    1+2*bit1+4*bit2+8*bit3+16*bit4;
    1+16*bit1+8*bit2+4*bit3+2*bit4;
    1+2*bit1;
    1+2*bit1+4*bit2;
    1+2*bit1+4*bit2+8*bit3;
    1+16*bit1;
    1+16*bit1+8*bit2;
    1+16*bit1+8*bit2+4*bit3;
    16+1*bit1+2*bit2+4*bit3+8*bit4; or
    1+2*bit1+4*bit2+8*bit3+16*bit4+32*bit5;
        where: bit1-bit5 are bits in the tracked device's MAC address overwritten or destroyed in the synthesis of the tracked device identifier (spoofed TA address).
The modified duration values shown above are only examples and other configurations may be used. In the above examples, any number of bits may be used, the first number may be changed, or the coefficients may be changed.

The system is preferably configured to prevent DoS (Denial of Service) attacks. For example, tracking devices 12 in the range of the provoking device may verify the existence of a provoking transmission SIFS before the response. The attack would therefore require two packets. The tracking devices 12 that are in the range of the provoking device may also verify the existence of a provoking transmission SIFS before the response and that the PHY (physical) characteristics of the packets are very different, so that the attack requires two separate devices. PHY characteristics may include RSSI, carrier offset, CSI (Channel State Information) (available from TxBF (transmit beamforming) coefficients, etc. Tracking devices 12 in the range of the provoking device may also verify that the BSSID (Basic Service Set Identifier) in a QoS Null transmission matches the MAC address of a trusted device (e.g., a potential provoking device). Another example is to dynamically vary the spoofing of the TA or duration so that the tracking devices can discard packets using a stale spoofing mechanism. For example, the spoofing policy may be changed once per minute or via regular notifications from a location server or WLC (WLAN controller) to the tracking devices. The provoking device and tracking devices may also report their transmit and received timestamps to the location server or WLC, which can filter packets so as to identify and discard packets received by tracking devices that do not correspond to provoking packets.

As can be observed from the foregoing, the embodiments described herein provide numerous advantages. For example, one or more of the embodiments are configured to work with existing IEEE 802.11 clients. Furthermore, the tracking device 12 does not need to be in the range of the provoking device. Also, one or more of the embodiments may provide protection from harmful attacks.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
receiving from a tracked device in a wireless network, a response message transmitted in response to a provoking message comprising a receiver address field and a transmitter address field, wherein an identifier of the tracked device is located in said transmitter address field, a field of said response message comprising said identifier of the tracked device copied from said provoking message, wherein a transmitter address is not provided in another field of said response message; and
processing said response message at a tracking device, wherein processing comprises measuring at least one location related parameter, extracting said identifier of the tracked device from said response message and identifying said response message as a location tracking message based on information in said response message;
wherein said response message is identified as a location tracking message based on a value in a duration field in said response message.

2. The method of claim 1 further comprising transmitting said provoking message from the tracking device to the tracked device.

3. The method of claim 1 wherein said provoking message comprises a Request to Send (RTS) frame and said response message comprises a Clear to Send (CTS) frame.

4. The method of claim 1 wherein said response message comprises an acknowledgement packet.

5. The method of claim 4 wherein said provoking message comprises a null frame.

6. The method of claim 1 wherein said provoking message comprises a duration field comprising a value different from a standard IEEE 802.11 duration.

7. The method of claim 1 wherein said response message comprises said tracked device identifier in a receiver address field.

8. The method of claim 1 wherein said response message comprises a MAC (Media Access Control) header comprising said tracked device identifier and said information identifying said response message as a location tracking message.

9. The method of claim 1 further comprising transmitting said identifier and said location related parameter to a location server.

10. The method of claim 9 wherein the location server is configured for receiving location tracking information from one or more other tracking devices, said location tracking information based on said response message.

11. An apparatus comprising:
a receiver configured for receiving a response message from a tracked device in a wireless network, said response message transmitted in response to a provoking message comprising a receiver address field and a transmitter address field, wherein an identifier of the tracked device is located in said transmitter address field, a field of said response message comprising said identifier of the tracked device copied from said provoking message, wherein a transmitter address is not provided in another field of said response message; and
a processor for measuring at least one location related parameter, extracting said identifier of the tracked device from said response message and identifying said response message as a location tracking message based on information in said response message;
wherein said provoking message comprises a duration field comprising a value different from a standard IEEE 802.11 duration.

12. The apparatus of claim 11 further comprising a transmitter for transmitting said provoking message from the apparatus to the tracked device.

13. The apparatus of claim 11 wherein said provoking message comprises a Request to Send (RTS) frame and said response message comprises a Clear to Send (CTS) frame.

14. The apparatus of claim 11 wherein said response message comprises an acknowledgement packet.

15. The apparatus of claim 11 wherein said response message comprises said tracked device identifier in a receiver address field.

16. The apparatus of claim 11 wherein said response message is identified as a location tracking message based on a value in a duration field in said response message.

17. The apparatus of claim 11 wherein said response message comprises a MAC (Media Access Control) header comprising said tracked device identifier and said information identifying said response message as a location tracking message.

18. The apparatus of claim 11 further comprising a transmitter for transmitting said identifier and said location related parameter to a location server configured for receiving location tracking information from tracking devices, said tracking information based on said response message.

19. An apparatus comprising:
a processor for measuring at least one location related parameter received in a response message at a tracking device, extracting an identifier of the tracked device from said response message, and identifying said response message as a location tracking message based on a value in a duration field in said response message; and
memory for storing said tracked device identifier and location tracking information;
wherein said response message comprises a message transmitted in response to a provoking message comprising a receiver address field and a transmitter address field, wherein said identifier of the tracked device is located in said transmitter address field, a field of said response message comprising said identifier of the tracked device copied from said provoking message, wherein a transmitter address is not provided in another field of said response message.

20. The apparatus of claim 19 wherein said provoking message comprises a duration field comprising a value different from a standard IEEE 802.11 duration.

* * * * *